United States Patent [19]
Foxx

[11] Patent Number: 6,120,108
[45] Date of Patent: Sep. 19, 2000

[54] BRAKE CYLINDER PRESSURE TAP WITH SPECIFIC ADVANTAGES FOR USE WITH FREIGHT CAR AIR BRAKING SYSTEMS

[75] Inventor: Michael J Foxx, Lebanon, N.J.

[73] Assignee: Strato, Inc., Piscataway, N.J.

[21] Appl. No.: 09/067,872

[22] Filed: Apr. 28, 1998

[51] Int. Cl.[7] .................................................. B60T 17/00
[52] U.S. Cl. ................................................. 303/1; 303/86
[58] Field of Search ................................... 251/143, 151; 285/133.21, 96, 68, 412, 368, 125.1; 303/1, 128, 86; 188/352, 144, 149

[56] References Cited

U.S. PATENT DOCUMENTS

| | | |
|---|---|---|
| 432,715 | 7/1890 | Westinghouse, Jr. .......................... 303/1 |
| 1,593,712 | 7/1926 | Farmer ........................................... 303/1 |
| 3,279,866 | 10/1966 | Donovan ....................................... 303/1 |
| 3,498,643 | 3/1970 | Reiss ........................................... 285/189 |

*Primary Examiner*—Robert J. Oberleitner
*Assistant Examiner*—Thomas J. Williams
*Attorney, Agent, or Firm*—Norris, McLaughlin & Marcus

[57] ABSTRACT

A wafer flange assembly designed to fit in between existing components of a freight car air braking system comprises a wafer flange having a center bore and an O-ring in surrounding relation thereto to create an airtight flowpath between the air braking system components, and further comprises a tunnel bore disposed within the wafer flange and creating an airtight flowpath from the brake cylinder line to a male quick disconnect valve mounted to the wafer flange, whereto a female quick disconnect valve may be attached to facilitate measurement of the brake cylinder line air pressure.

14 Claims, 9 Drawing Sheets

BRAKE CYLINDER PRESSURE TAP WITH SPECIFIC ADVANTAGES FOR USE WITH FREIGHT CAR AIR BRAKING SYSTEMS

FIELD OF THE INVENTION

This invention relates to a brake cylinder pressure tap particularly suited for use with rail car air braking systems and including a wafer flange integrally comprising a quick disconnect valve assembly and other structural and mechanical features directed to making the apparatus specially adapted for use in combination with current freight, locomotive, and/or passenger rail car air braking systems to allow for testing of such systems.

BACKGROUND OF THE INVENTION

Air braking systems are currently in use on all freight cars. The primary function of a freight car air braking system is to provide a reliable means of slowing and stopping the car, and maintaining the car in a stationary position at the operator's discretion. Due to the obvious operational safety concerns inherent in the widespread use of such air braking systems, the mechanical, structural, and operational characteristics of these systems have been standardized by the Association of American Railroads (AAR) in the Manual of Standards and Recommended Practices, Section E, Parts I and II, Brakes and Brake Equipment. All freight cars used in interchange service in North America must comply with the requirements outlined in this publication. Other railroads, both domestic and international, have chosen to adopt the requirements of the AAR standards.

There is only one type of freight car air braking system used in the industry. This system is known as an "AB" equipment air braking system. While variations in the components of this system have been introduced and implemented over the 60 years since the system's development, the components in each variation have by design remained functionally interchangeable. The essential components of the system include a control valve, and a plurality of compressed air reservoirs, brake cylinders, and pipes (including flange and socket assemblies which allow the pipes to be connected to the other components of the system). In a typical configuration, the brake cylinder line is coupled to the brake cylinder via a standard flange and socket assembly. One end of the brake cylinder pipe is welded to the assembly, and the assembly is coupled to the brake cylinder's receptor socket by two bolts which pass through the wings of the assembly. Air flow and pressure are maintained through this coupling by a center hole in the assembly which includes an O-ring in surrounding relation to the center hole to prevent air leakage. The air pressure in the freight car's main brake line is typically maintained at 90 psi. When the operator activates the braking system, the air pressure in the main brake line drops below 90 psi, signaling the control valve to direct compressed air from the reservoirs through the brake cylinder lines to the brake cylinders, which mechanically apply the wheel brakes accordingly. When the operator of the train releases the braking system, the air pressure in the main brake line returns to 90 psi, signaling the control valve to terminate the delivery of compressed air from the reservoirs, exhausting air from the brake cylinders to mechanically release the wheel brakes accordingly.

For the air braking system to operate safely and effectively, air leakage to and from the brake cylinder components must be minimal. To address the need for frequent testing of the brake cylinder system, the AAR technical committee approved, and industry regulators endorsed, industry compliance with the air brake test specifications outlined in a document entitled "Instruction Pamphlet 5039-4. Sup. 1" which was published by air brake manufacturers Westinghouse Air Brake and New York Air Brake, and subsequently issued as AAR Standard S-486 ("S-486") According to these testing specifications, the air brake system is to be checked whenever the freight car is removed from service due to an air brake system defect. The frequency with which this occurs varies, but is approximately 1.7 times per year per freight car according to industry data.

The current test procedure does not provide for direct measurement of brake cylinder pressure. In recent years, some provision has been made for determining that brake cylinder pressure is decreasing but there has been no way to readily determine if brake cylinder pressure is increasing. The AAR is currently processing changes to S-486 to call for direct measurement of brake cylinder pressure when brake related wheel damage is suspected. Present methods of obtaining this direct measurement of pressure and leakage involve disconnecting rigid steel pipes, inserting temporary pressure measuring devices, checking for leakage of these devices, checking the brake cylinder leakage, removing the temporary devices, and rechecking for leakage from the permanent pipe system. These procedures, although cumbersome, costly, and manhour intensive, will seek to address repetitive wheel damage to freight cars.

AAR data indicates that in 1996, the total number of wheel sets removed for tread defects was 133,964 sets. It is widely accepted in the industry that since this data does not account for instances when railroad yards repair their own freight cars, the actual number of sets would be approximately double this number, almost 268,000 sets. If it is assumed that the cost of replacing a tread damaged wheel set can be conservatively taken to be $1,000, then the cost to the industry is $268 million. With 1.3 million freight cars in service, this amounts to $206 per car per year as potential savings if tread defects could be totally eliminated. A further cost associated with wheel tread damage is the cost of damage to the track. Track damage costs are very difficult to estimate but some estimates are as high as the wheel removal costs.

A proposed Standard S-4020 ("S-4020") has recently been drafted by the AAR to specify the minimum functional and mechanical requirements, including the testing procedures, for AAR standard brake cylinder pressure taps for use during the S-486 testing, and the preferred locations of the pressure taps on freight cars of different design. While freight cars may have brake cylinder pressure taps of different design, all cars will soon be required to have at least one pressure tap which conforms generally to the proposed standard.

The S-4020 proposal stipulates that the brake cylinder pressure tap system must include a male quick disconnect valve located in a welded pipe fitting at the control valve pipe bracket, in the brake cylinder pipe, or in the brake cylinder itself. Each of these locations poses specific system design challenges. The proposed specification does not dictate how the male quick disconnect must be mounted in these locations, but rather, the pressure tap system design has been left to industry manufacturers.

The male quick disconnect valve must be of a non-oxidizing material (e.g., brass) that will withstand corrosion, and must be approved according to AAR test specifications. An O-ring seal to be used in this part is a nitrile compound which has a temperature rating of −65° F. to 225° F. The proposed standard dictates that the quick disconnect valve must be of a normally closed design and it must create an airtight seal at temperatures between −50° F. and 150° F. The valve must provide a brake cylinder connection to a pressure gauge when the female portion of the quick disconnect is fully mated with the valve stem. The configuration of the tap system must be such that no tools are required during the connect/disconnect process.

The S-4020 proposal also stipulates that the quick disconnect valves be able to pass three qualification tests. To pass the first test, the male and female quick disconnect valves must be able to be connected and disconnected 1,000 times while pressurized at 100 psi, without leaking at the coupling joint and at the male valve with the female valve disconnected. To pass the second test, the same valve configuration must be able to be heated to 150±2° F. for 24 hours at 100 psi, without leaking at the coupling joint and at the male valve with the female valve disconnected. To pass the third test, the same valve configuration must be able to be chilled to −50±2° F. for 24 hours at 100 psi, without leaking at the coupling joint and at the male valve with the female valve disconnected.

Additionally, the male quick disconnect valve must be able to pass a standard ANSI/ASTM B117 Salt Spray Test. After the valve has been subjected to the test's corrosive environment for 96 hours, subsequently cleaned with only a dry cloth, rag, or towel, and thereafter subjected to the third test outline above, a connection with a female valve must be made with the same ease as a new male valve not subjected to the corrosive environment.

Not only must the brake cylinder pressure tap system withstand the corrosive environment in which freight cars must necessarily function, but it must also be well-suited for access by maintenance and testing personnel. The S-4020 proposal therefore stipulates that suitable clearances around the disconnect valve must be maintained. Specifically, a 2.5 inch radius around the pressure tap must exist, with the exception of a 1.5 inch radius along one side of the pressure tap.

It should be reiterated that the S-4020 proposal does not dictate a specific system design, but rather only that an acceptable pressure tap will meet minimum operational and mechanical requirements. As such, manufacturers throughout the industry are free to develop acceptable system designs for the approved quick disconnect locations, each of which poses a unique design challenge.

Relevant prior art includes various pipe spacers and connectors, included and cited in Swivel Flanged Fitting, U.S. Pat. No. 3,498,643 (Mar. 3, 1970—expired), Pipe Spacer Used In Welding, U.S. Pat. No. 4,346,918 (Aug. 31, 1982), Pipe With Flange For Pipe Fitting, Pipe Flange Used Therewith and Method of Joining Said Pipe With Flange With Pipe, U.S. Pat. No. 5,415,443 (May 16, 1995), and Pipe Adapter Flange, U.S. Pat. No. 5,437,482 (Aug. 1, 1995). These systems are primarily used in conjunction with welding procedures, and/or are used simply to connect two or more pipes. While the present invention also serves to connect two or more pipes, this function is ancillary and is not the object of the invention. Rather, the purpose of the present invention is to provide a means for retrofitting already existing pipes in pressurized air systems with a means to quickly and easily measure the air pressure in the system. As S-486 has only recently been promulgated, none of the systems which comprise the relevant prior art serve this function.

SUMMARY OF THE INVENTION

A primary object of the present invention is to provide a brake cylinder pressure tap which can be used in combination with a freight car's existing air braking system to allow for testing of the brake cylinder system. It should be reiterated that although the present invention is designed primarily for application to freight car air braking systems, it can also be used in connection with locomotive and passenger rail car air braking systems.

The present invention comprises a wafer flange having a quick disconnect valve assembly, and is designed to be permanently installed in combination with a freight car's existing air braking system. In accordance with a preferred embodiment of the present invention, the wafer flange of the invention is designed to fit between a standard air braking system's brake cylinder line flange and socket assembly and brake cylinder receptor socket. The two bolts used to connect these braking system components are discarded and replaced with similar but longer bolts which secure the wafer flange by passing through two holes in the wings of the flange. Air flow and pressure are maintained through this coupling by a center hole in the wafer flange and an O-ring placed in surrounding relation to the center hole to prevent air leakage. A male quick disconnect valve assembly is mounted on a portion of the wafer flange which extends out and away from the new coupling. The valve assembly is mounted on this extended portion such that its cylindrical axis is parallel to the air brake pipe. A hole through the body of the wafer flange provides an air passageway from the flange's center hole to the base of the valve assembly. When a standard female quick disconnect and pressure gauge assembly is coupled to the present invention's male quick disconnect valve assembly, an air passageway is formed between the air brake system's main air passageway and the pressure gauge assembly, thereby allowing the air pressure to be easily measured.

In accordance with another embodiment of the present invention, the wafer flange of the invention is designed to fit into the brake cylinder line between two standard air braking system brake cylinder line flange and socket assemblies. Similar to the preferred embodiment, the two bolts used to connect these flange and socket assemblies are discarded and replaced with similar but longer bolts which secure the wafer flange by passing through two holes in the wings of the flange. Air flow and pressure are maintained through the coupling by a center hole in the wafer flange and an O-ring placed in surrounding relation to the center hole to prevent air leakage. As in the preferred embodiment, a male quick disconnect valve assembly is mounted on a portion of the wafer flange which extends out and away from the new coupling. The valve assembly is mounted on this extended portion such that its cylindrical axis is parallel to the air brake pipes. A hole through the body of the wafer flange provides an air passageway from the flange's center hole to the base of the valve assembly. When a standard female quick disconnect and pressure gauge assembly is coupled to the present invention's male quick disconnect valve assembly, an air passageway is formed between the air brake system's main air passageway and the pressure gauge assembly, thereby allowing the air pressure to be easily measured.

Several advantages of the present invention over the prior art are readily apparent. First, the present invention provides for the detection and measurement of air leaking into and out of the brake cylinder system. Second, because air leaking into the brake cylinder as a result of a control valve defect is detectable through use of the present invention, costly repetitive damage to the wheels of the freight car is reduced and possibly eliminated. This potentially results in tremendous cost savings of approximately $206 per car per year as discussed above. Third, an extension of the second advantage is that additional cost savings are obtained because damage to the track is avoided as well. While cost savings estimates are more difficult to quantify, it is clear that with damage estimates in this area comparable to wheel removal costs, the savings to the industry would be significant. Fourth, because the present invention eliminates the need for the testing procedure which used a temporary flange, approximately one manhour per year per car will be saved. Finally, incident safety advantages are achieved through the use of the present invention because of the decreased manhours, and less time spent handling the system's components.

It should be noted that these advantages are underscored in that the estimated cost of adding the present invention to existing freight car air braking systems is on the order of $40 per car. Therefore, if even 20% of brake induced wheel defects could be eliminated, the cost of the device could be recovered within a one year period. The cost recovery period may be even shorter if the above-mentioned track damage is eliminated by the present invention.

It is anticipated that the present invention can be retrofitted into existing freight car air braking systems with minimal changes to the systems. On approximately 75% of the existing freight cars, the present invention can be retrofitted into the air braking system simply by removing the two securing bolts, and replacing them with longer bolts once the wafer flange is in place. Due to the flexibility in the brake cylinder line and the allowable stress levels, few changes to the brake cylinder line are required (occasionally, the pipes in the brake cylinder line may need to be stress-relieved and realigned for proper fit). On the remaining 25% of the freight cars, the present invention can also be retrofitted. However, the braking system configuration on these cars requires the installation of additional components in order for the present invention to integrate correctly. Even though these additional components are already commercially available, the retrofit will take longer on these freight cars. Nevertheless, once these freight cars are retrofitted, the advantages outlined above will be achieved by the present invention.

DETAILED DESCRIPTION OF THE PREFERRED EMBODIMENT

Figure 1:
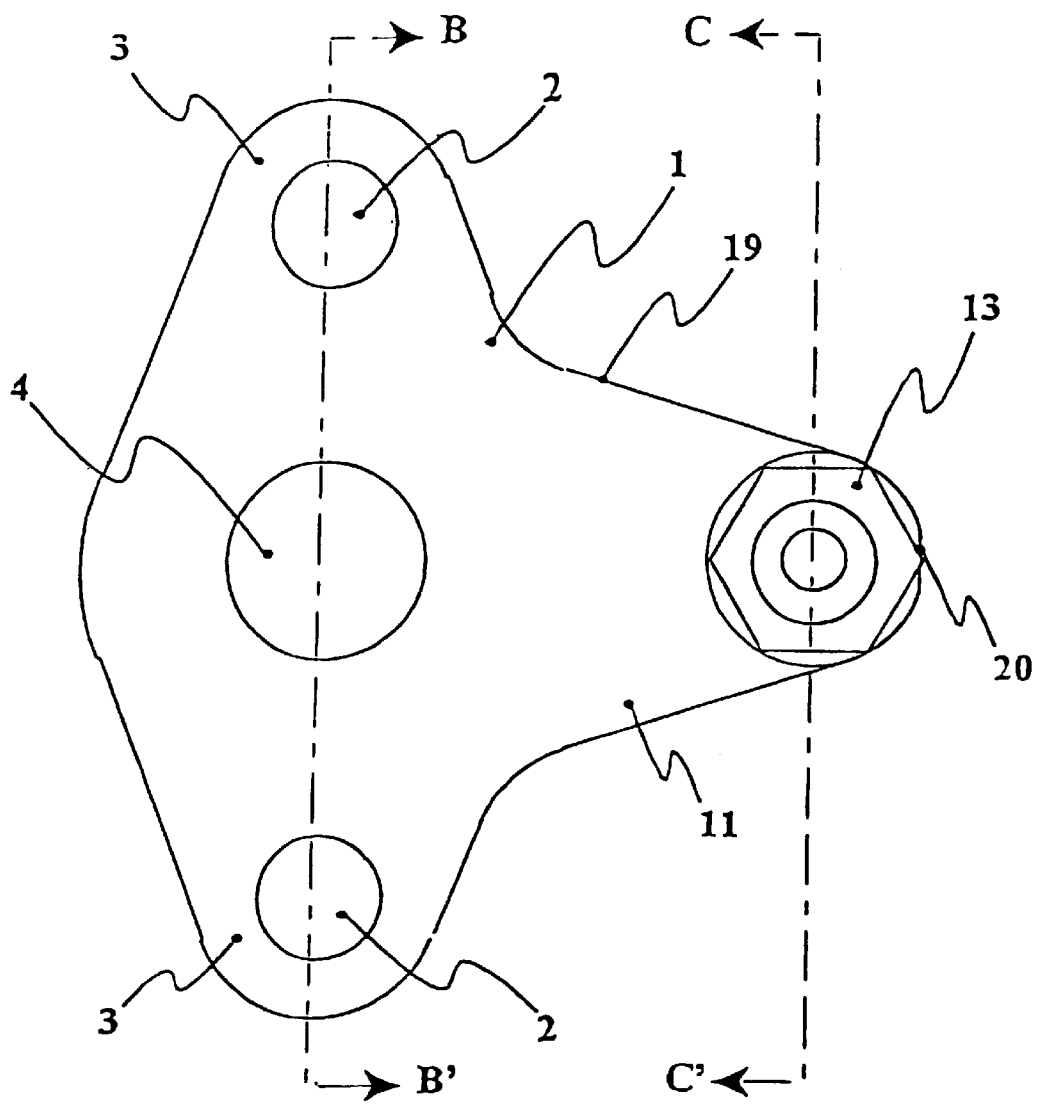
FIG. 1 is a plan view of the top of the preferred embodiment of the present invention.
Figure 2:
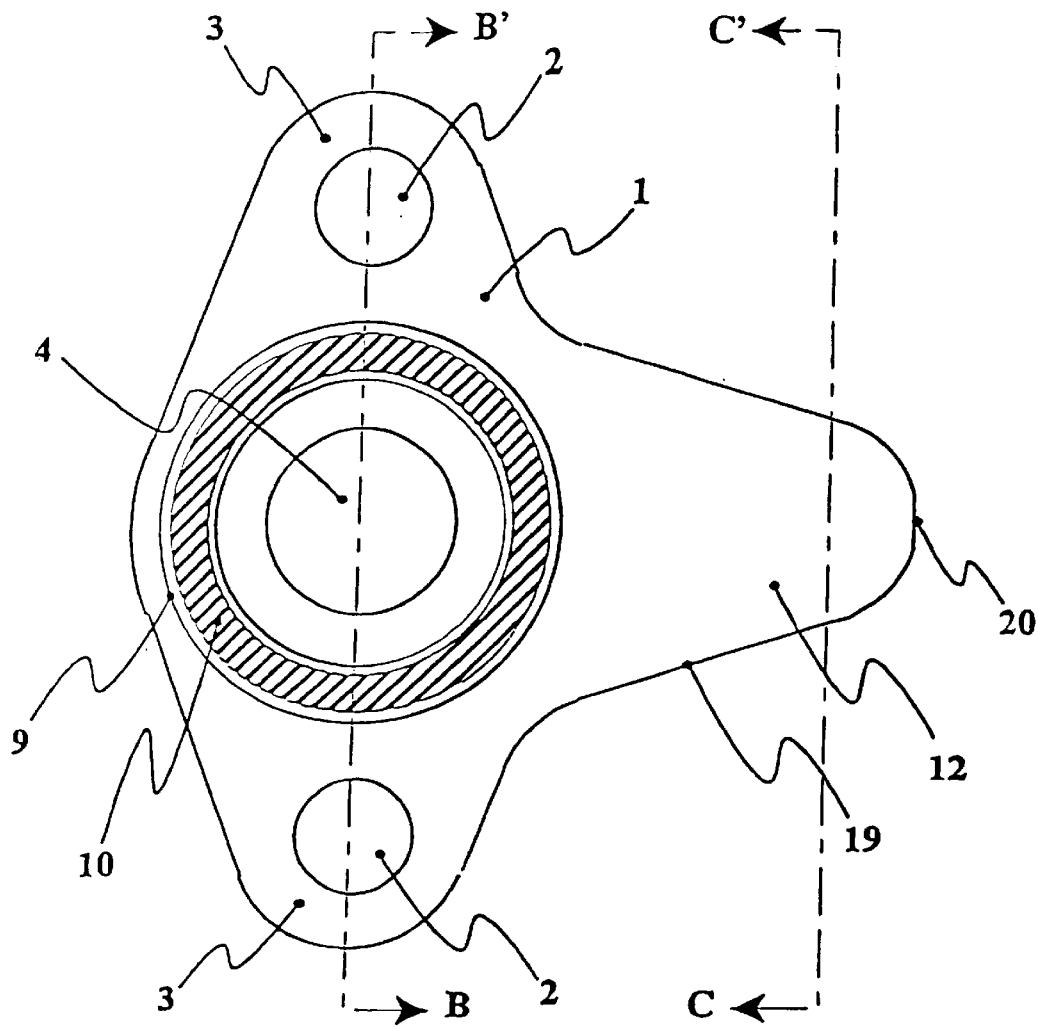
FIG. 2 is a plan view of the bottom of the preferred embodiment of the present invention.
Figure 3:
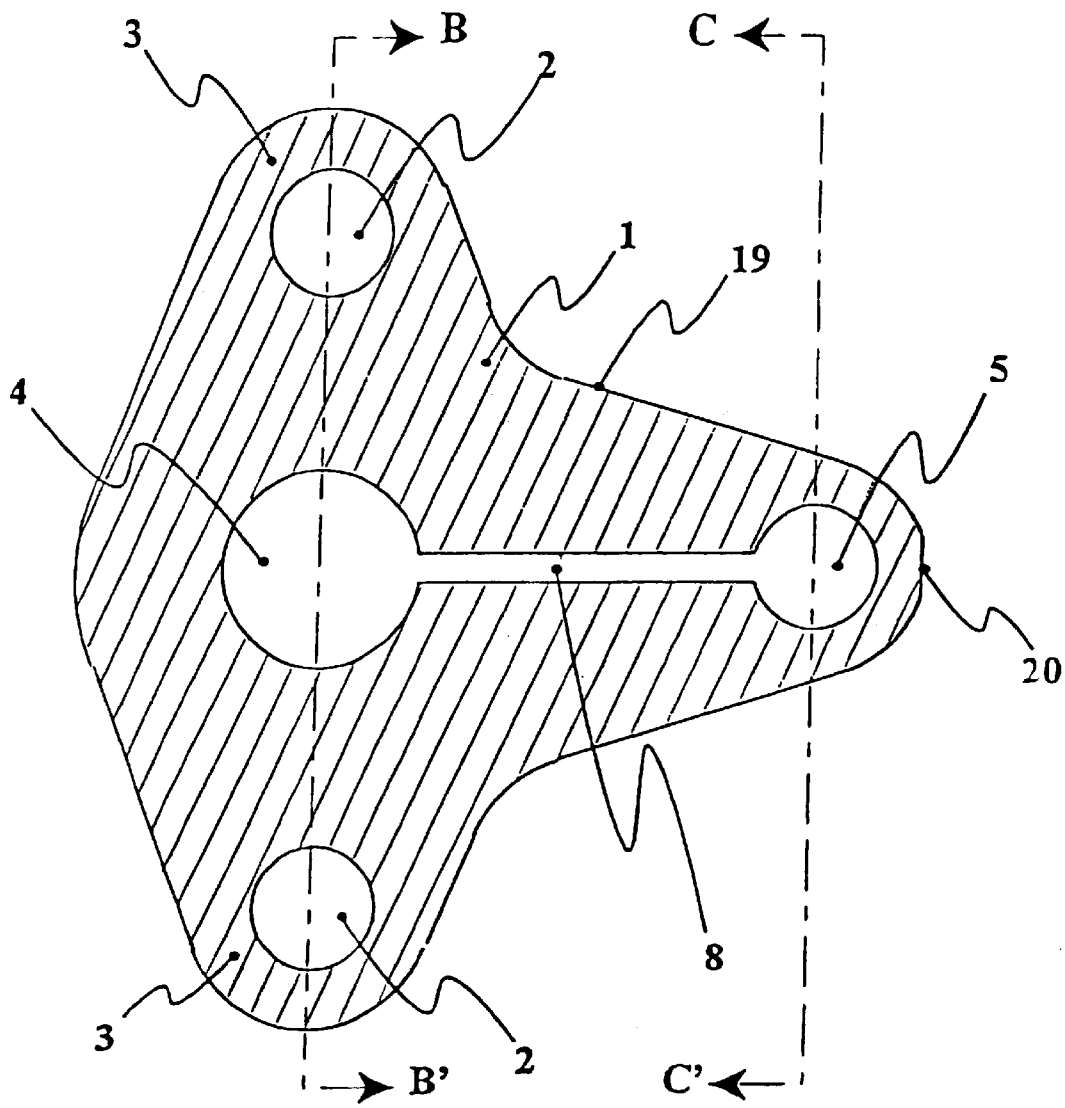
FIG. 3 is a plan view of a section of the preferred embodiment of the present invention, slicing along plane A-A' in FIGS. 4 and 5.
Figure 4:
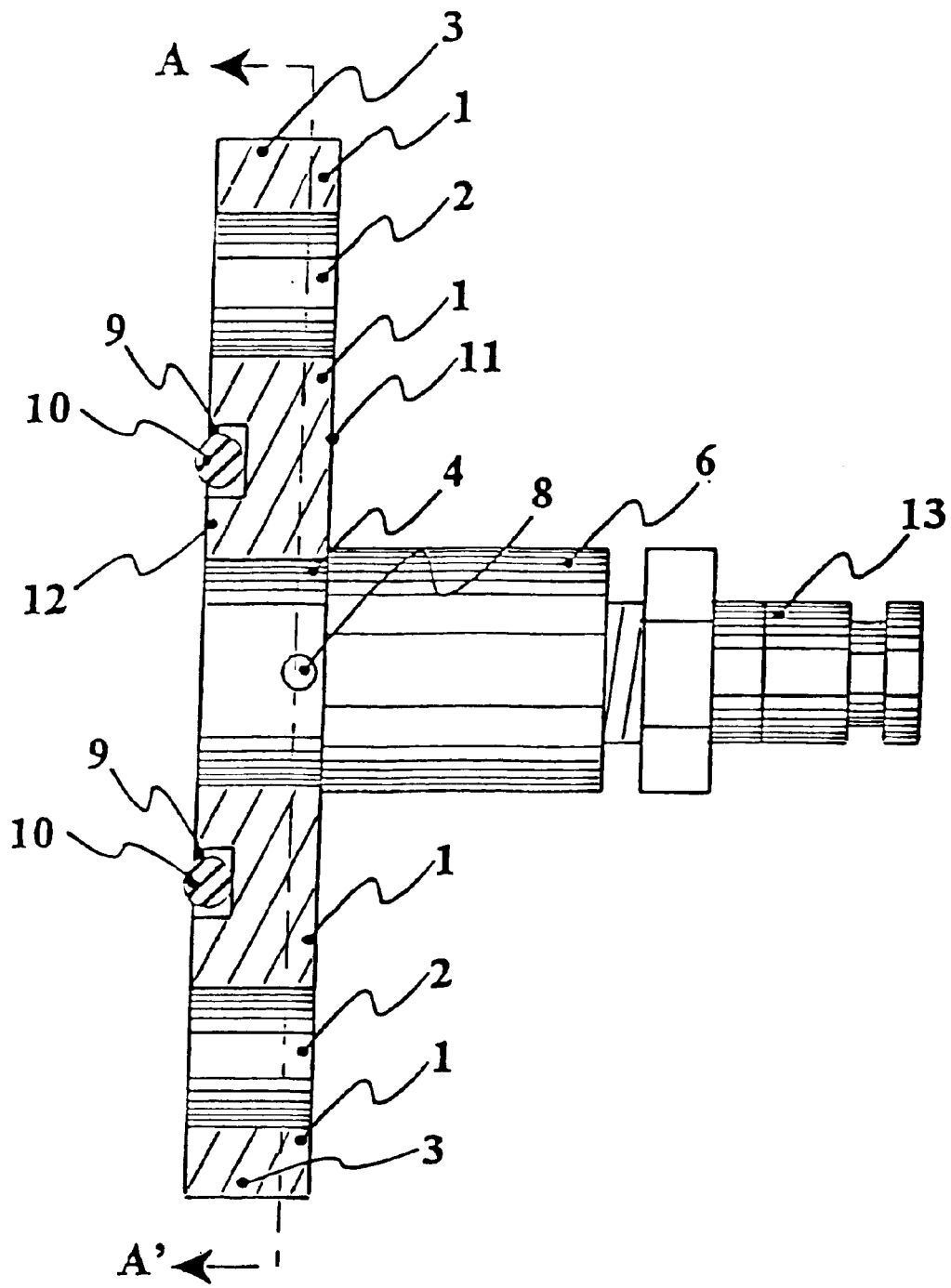
FIG. 4 is an elevation view of a section of the preferred embodiment of the present invention, slicing along plane B-B' in FIGS. 1 through 3.
Figure 5:
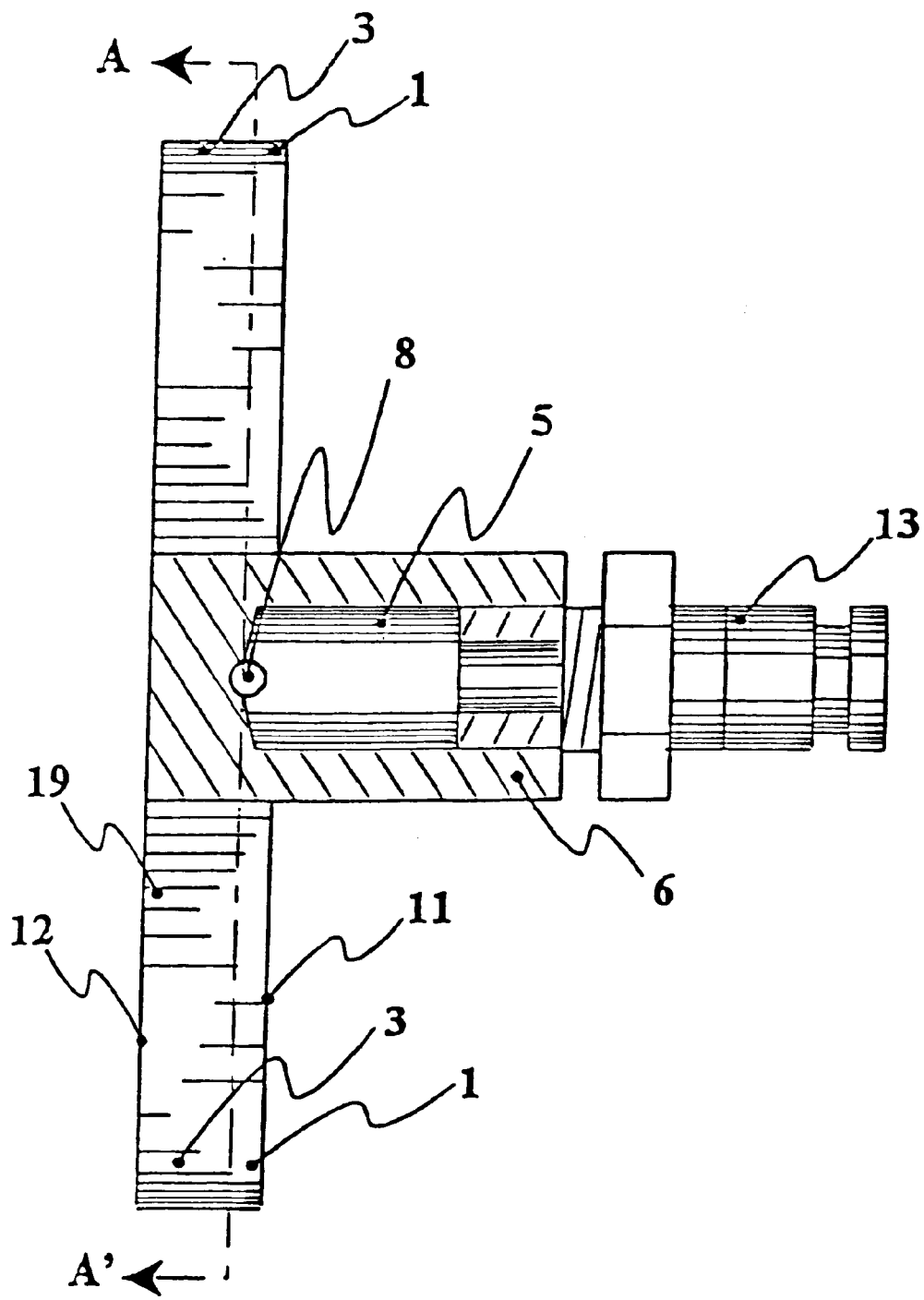
FIG. 5 is an elevation view of a section of the preferred embodiment of the present invention, slicing along plane C-C' in FIGS. 1 through 3, but not slicing through the male quick disconnect valve itself.

Referring to FIGS. 1 through 5, the body 1 of the wafer flange is formed from a powdered metal, designation MPIF FX-100850, or from a material with similar structural characteristics. The flange body 1 has a top face 11 and a bottom face 12 which are substantially parallel, and at least one side face 19. Cylindrical full bolt bores 2 each having cylindrical axes substantially perpendicular to the top face 11 of the flange body 1 extend fully through the wings 3 of the flange body 1.

At least one full bore 4 having a cylindrical axis substantially perpendicular to the top face 11 of the flange body 1 extends fully through the center of the flange body 1, and includes a first open end and a second open end, said first open end being open to said top face 11 and said second open end being open to said bottom face 12, such that pressurized brake system air flows therethrough.

At least one partial bore 5 having a cylindrical axis substantially perpendicular to the top face 11 of the flange body 1 extends partially through the flange body 1 and includes an open end, said open end being open to one of said top face 11, said bottom face 12, and said at least one side face 19, such that air is permitted to flow therethrough. In this preferred embodiment, said open end is open to said top face 11. A raised tubular portion 6 having a cylindrical axis substantially perpendicular to the top face 11 of the flange body 1 is formed on the surface of one of said top face 11, said bottom face 12, and said side face 19, such that it serves to extend said open end of the partial bore 5. In this preferred embodiment, the raised tubular portion 6 is formed on the surface of said top face 11. A standard male quick disconnect valve assembly 13 is mounted to the tubular portion 6 such that the valve assembly 13 is in air flow permitting relation to the partial bore 5.

A tunnel bore 8 extends within the flange body 1 and includes a first open end and a second open end, said first open end being open to the full bore 4, said second open end being open to the partial bore 5, such that air is permitted to flow therethrough. In accordance with one aspect of the present invention, the tunnel bore 8 is formed by initially boring a hole from the outer edge 20 of the flange body 1, through diametrically opposite locations on the wall of the partial bore 5 and into the full bore 4. Thereafter, the portion of the bored hole from outer edge 20 to the near wall of the partial bore 5 is filled and resealed by, for example, a conventional brazing operation.

A circular groove 9 is formed on the bottom face 12 of the flange body 1 in surrounding relation to the full bore 4. This groove 9, which houses a rubber O-ring 10, has a width larger than the diameter of the O-ring 10 and a depth smaller than the diameter of the O-ring 10, such that over the entire circumference of the circle formed by the O-ring 10, the O-ring 10 fits within the groove 9 while a portion of the O-ring 10 remains above the plane which includes the surface of the bottom face 12 of the flange body 1. This feature makes possible the airtight seal discussed below.

Figure 6:
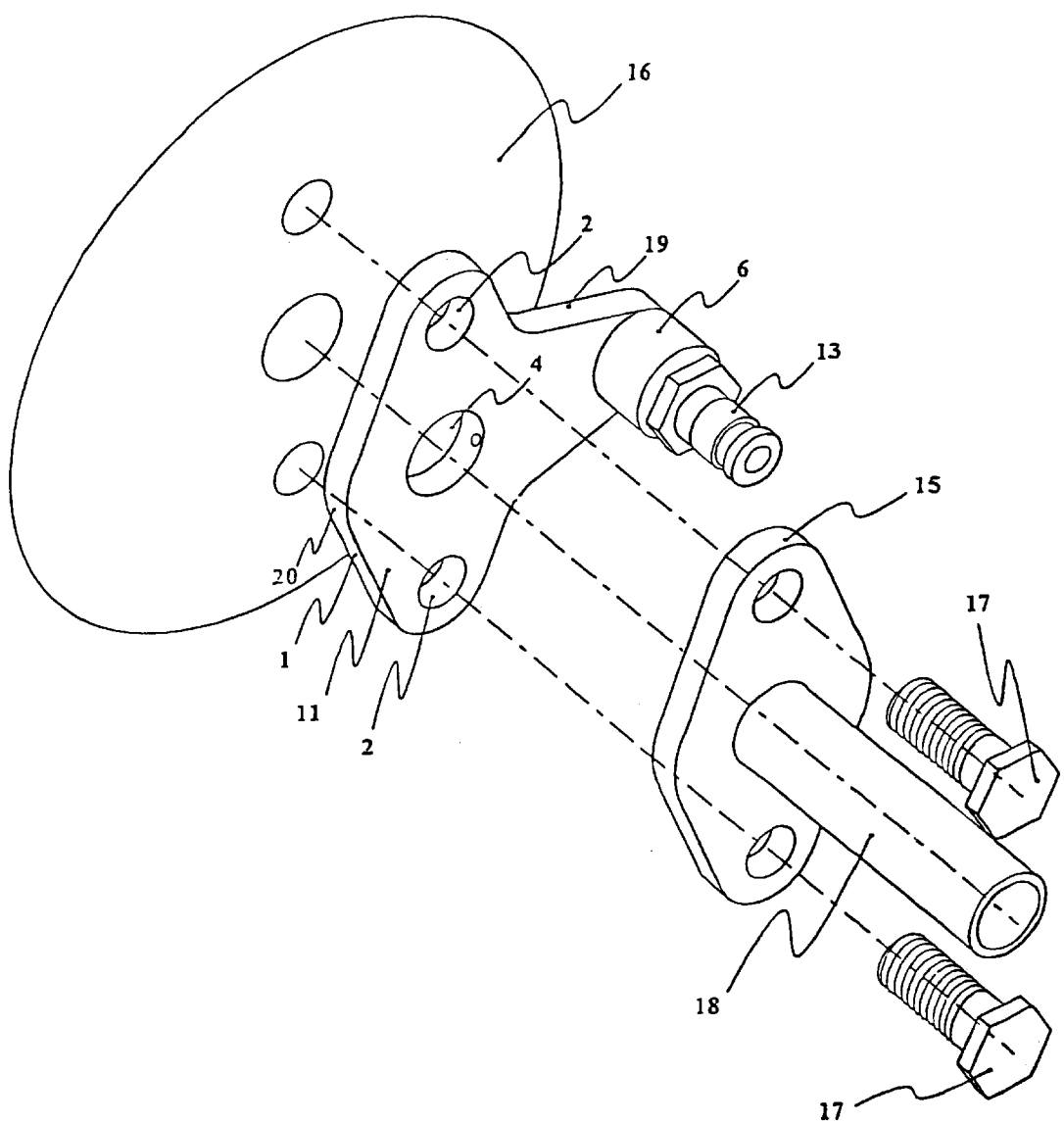
FIG. 6 is an isometric view of the positioning of the preferred embodiment of the present invention in its intended application.
Figure 7:
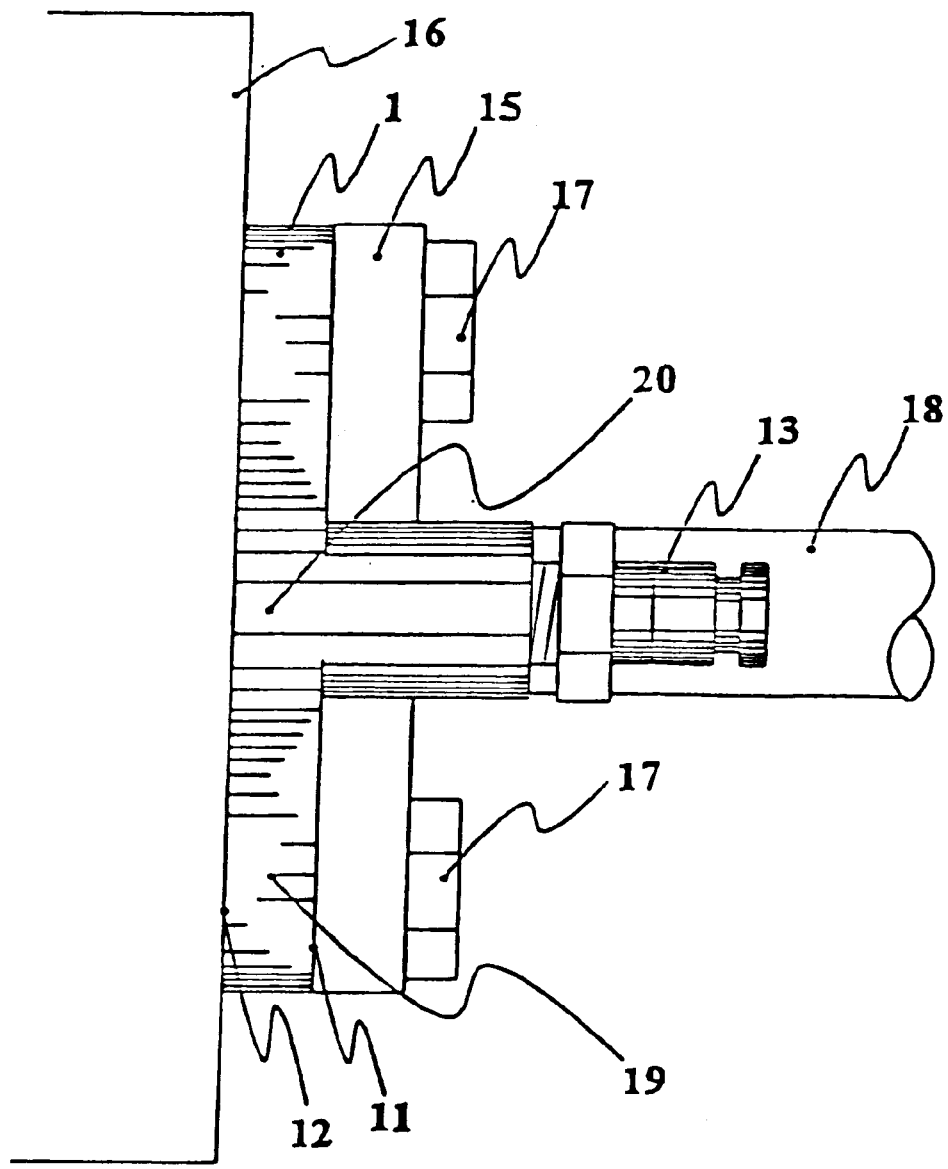
FIG. 7 is a plan view of the positioning of the preferred embodiment of the present invention in its intended application.

Referring also to FIGS. 6 and 7, the wafer flange 1 fits between a standard air braking system's brake cylinder line flange and socket assembly 15 and the brake cylinder receptor socket 16. The two bolts used to connect these braking system components in the typical configuration (i.e., without the present invention) are discarded and replaced with similar but longer bolts 17 which secure the wafer flange 1 by passing through the full bolt bores 2.

Air flow is maintained through the new configuration by the full bore 4, which has a diameter substantially equal to the diameter of the brake cylinder line 18 (approximately 1 inch in a typical configuration). The brake cylinder line 18 serves as an airflow permitting component of an air braking system. Air pressure is maintained through the new configuration by the rubber O-ring 10, which creates an airtight seal between the bottom face 12 of the flange body 1 and the brake cylinder receptor socket 16. A similar seal is maintained between the brake cylinder line flange and socket assembly 15 and the top face 11 of the flange body 1 by a rubber O-ring (not shown) which already exists in the standard configuration. In a typical configuration, this existing rubber C-ring maintains an airtight seal between the brake cylinder line flange and socket assembly 15 and the brake cylinder receptor socket 16. In the new configuration, this existing rubber O-ring maintains an airtight seal between the brake cylinder line flange and socket assembly 15 and the top face 11 of the flange body 1.

Once the wafer flange 1 is secured by the new bolts 17, the pressure of the air in the system can be tested without the need to remove or replace the wafer flange 1. A female quick disconnect and pressure gauge assembly can be coupled to the male quick disconnect valve assembly 13. Pressurized air passes from the full center bore 4 through the tunnel bore 8, into the partial bore 5, into the male quick disconnect valve assembly 13, and into the female quick disconnect valve and pressure gauge assembly where the air pressure can be measured. Once the air pressure is measured, the female quick disconnect and pressure gauge assembly can be released, and the air braking system can again be used.

Figure 8:
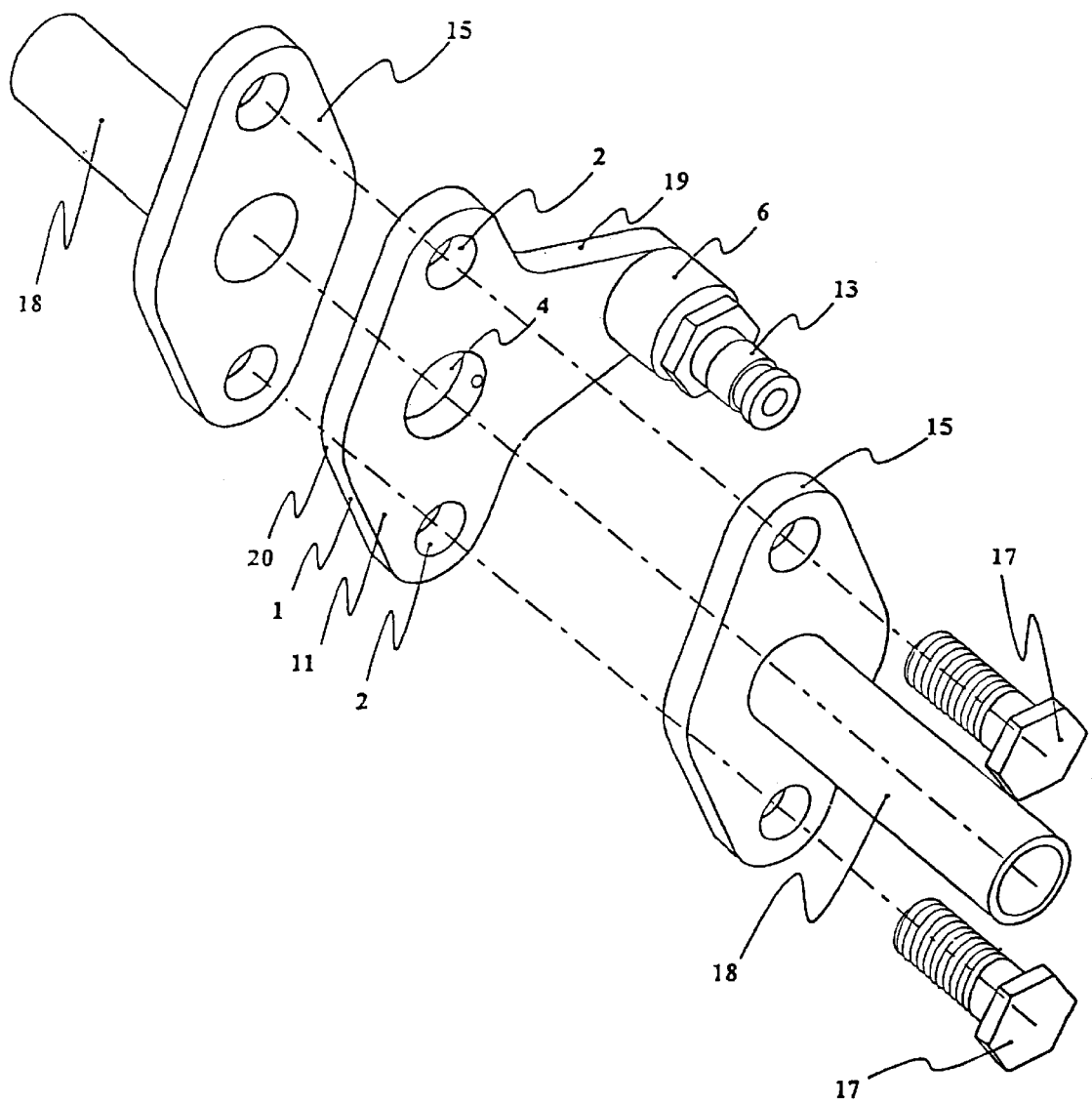
FIG. 8 is an isometric view of the position of the alternate embodiment of the present invention in its intended application.
Figure 9:
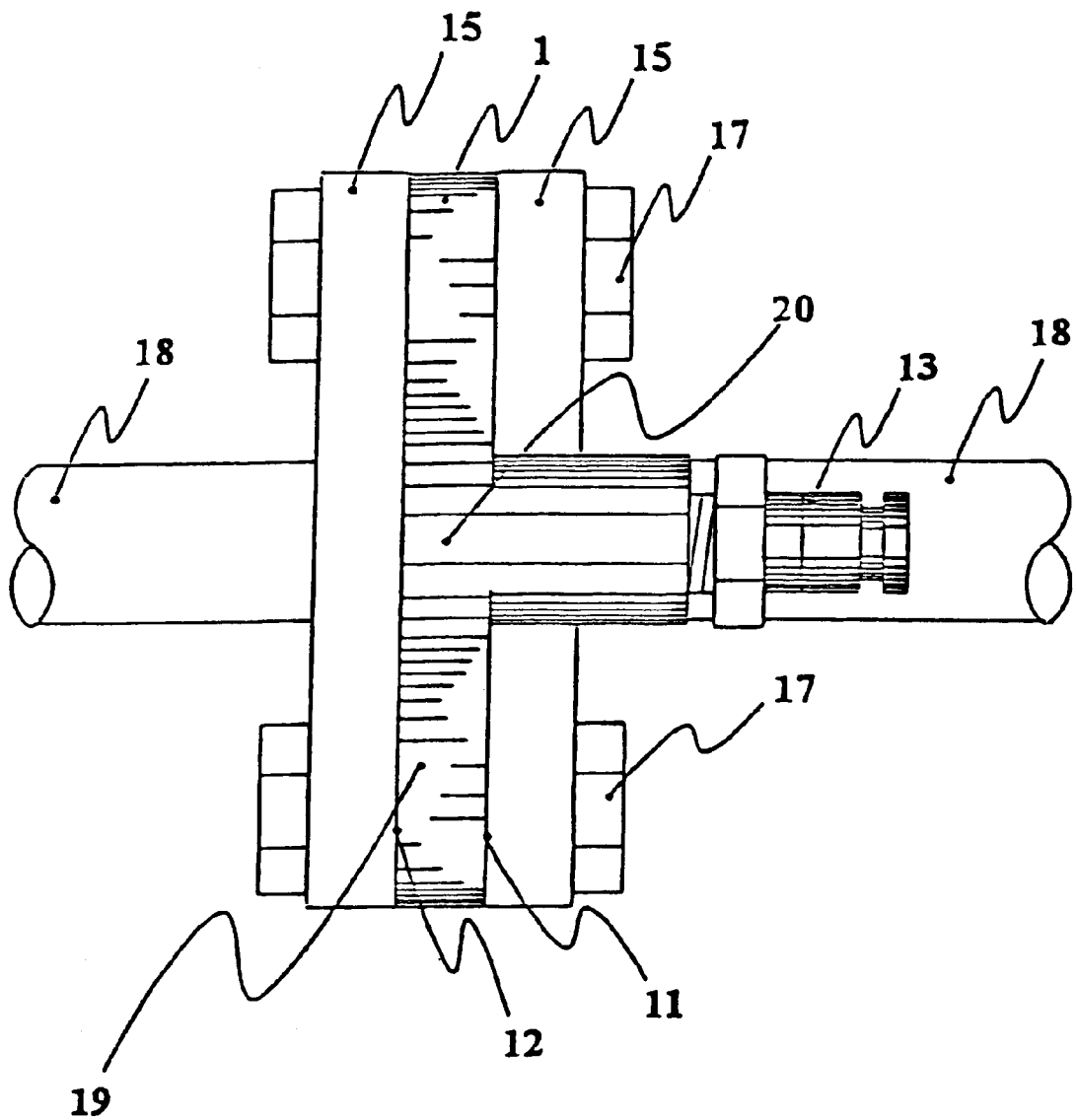
FIG. 9 is a plan view of the positioning of the alternate embodiment of the present invention in its intended application.

Referring to FIGS. 8 and 9, the wafer flange 1 in the alternate embodiment fits between two standard air braking system brake cylinder line flange and socket assemblies 15. This coupling is substantially similarly achieved as described in the preferred embodiment above, using longer bolts 17 which secure the wafer flange 1 by passing through the full bolt bores 2. Airflow is substantially similarly maintained through this configuration as described in the preferred embodiment above, using the existing rubber O-ring and the additional O-ring 10 to create airtight seals between the wafer flange 1 and the brake cylinder line flange and socket assemblies 15. The pressure of the air in the air braking system is substantially similarly tested as described in the preferred embodiment above, using a female quick disconnect and pressure gauge assembly coupled to the male quick disconnect valve assembly 13.

Although the preferred embodiments and practical alternatives to the invention are described above by way of example, it will be understood that modifications may be made to the disclosed embodiments without departing from the scope of the invention, which is defined by the appended claims. These modifications include but are not limited to incorporating components of modules into other modules, exchanging components of one module with the components of other modules, or such components themselves comprising distinct separate independently removable modules.

What is claimed is:

1. A brake system pressure tap adapted for retrofit into existing train braking systems comprising:

a flange member having
      a top face,
      a bottom face,
      at least one side face,
      at least one full bore extending fully through the body of said flange member, said at least one full bore including a first open end and a second open end, said first open end being open to said top face and said second open end being open to said bottom face, such that pressurized brake system air flows therethrough,
      at least one partial bore extending partially through the body of said flange member, said at least one partial bore including an open end, said open end being open to one of said top face, said bottom face, and said at least one side face, such that air is permitted to flow therein,
      at least one tunnel bore extending within the body of said flange member, said at least one tunnel bore including a first open end and a second open end, said first open end being open to said full bore, said second open end being open to said partial bore, such that air is permitted to flow therethrough, and
   a valve assembly mounted on the body of said flange member in air flow permitting relation to said open end of said partial bore, wherein the body of said flange member includes a raised tubular portion formed on the surface of one of said top face, said bottom face, and said side face, such that said raised tubular portion serves to extend said open end of said partial bore.

2. A pressure tap as claimed in claim 1, wherein said raised tubular portion has a cylindrical axis.

3. A pressure tap as claimed in claim 2, wherein
   said partial bore has a cylindrical axis, and
   the cylindrical axis of said raised tubular portion is substantially coaxially related to the cylindrical axis of said partial bore.

4. A pressure tap as claimed in claim 3, wherein said open end of said partial bore is open to said top face.

5. A pressure tap as claimed in claim 4, wherein the cylindrical axis of said partial bore is substantially perpendicular to the surface of said top face.

6. A pressure tap as claimed in claim 5, wherein
   said full bore has a cylindrical axis substantially perpendicular to the surface of said top face, and wherein
   the surface of said top face and the surface of said bottom face are substantially parallel.

7. A pressure tap as claimed in claim 1, further comprising means for securing said full bore of said flange member in airtight coupling relation between at least one first airflow permitting component of a pressurized air system and at least one second airflow permitting component of a pressurized air system such that airflow from said at least one first component and said at least one second component is permitted through said full bore, wherein said securing means includes at least one O-ring maintained in surrounding relation to said bottom end of said full bore such that said O-ring is maintained in abutting contact between said at least one second component and said second open end.

8. A pressure tap as claimed in claim 7, wherein said securing means includes at least one groove formed in said bottom face of said flange member in surrounding relation to said second open end of said full bore, said at least one groove having a width larger that the diameter of said O-ring, a depth smaller than the diameter of said O-ring, and forming a circle diametrically similar to the circle formed by said O-ring, such that over the entire circumference of the circle formed by said O-ring, said O-ring fits within said at least one groove while at least a portion of said O-ring remains above a plane which includes the surface of said bottom face.

9. A pressure tap as claimed in claim 8, wherein said at least one first component is a brake cylinder line flange and socket assembly of a standard rail car air braking system.

10. A pressure tap as claimed in claim 9, wherein said at least one second component is a brake cylinder receptor socket of a standard rail car air braking system.

11. A pressure tap as claimed in claim 7, wherein said securing means includes at least one bolt bore extending fully through the body of said flange member, said bolt bore including a first open end and a second open end, said first open end being open to said top face and said second open end being open to said bottom face, said bolt bore having a cylindrical axis, the cylindrical axis of said bolt bore is substantially perpendicular to the surface of said top face, said top face is substantially parallel to said bottom face, said securing means includes two of said bolt bores and said full bore is positioned between said two of said bolt bores, and said at least one first component is a brake cylinder line flange and socket assembly of a standard rail car air braking system.

12. A pressure tap as claimed in claim 11, wherein said at least one second component is a brake cylinder receptor socket of a standard rail car air braking system, the cylindrical axes of said two of said bolt bores are coaxial with the respective cylindrical axes of the corresponding bolt bores of the brake cylinder line flange and socket assembly and the corresponding bolt bores of the brake cylinder receptor socket, and each of said two of said bolt bores have a diameter substantially equal to the diameters of the corresponding bolt bores of the brake cylinder line flange and socket assembly and the corresponding bolt bores of the brake cylinder receptor socket.

13. A pressure tap as claimed in claim 12, wherein said full bore has a diameter substantially equal to the diameter of a brake cylinder line of a standard rail car air braking system.

14. A pressure tap as claimed in claim 1, wherein said valve assembly is a male quick disconnect valve.

* * * * *